UNITED STATES PATENT OFFICE.

WILLIAM HORLICK, JR., OF RACINE, WISCONSIN.

FOOD COMPOUND AND PROCESS OF MAKING THE SAME.

1,260,542.

Specification of Letters Patent. Patented Mar. 26, 1918.

No Drawing. Application filed January 22, 1918. Serial No. 213,213.

*To all whom it may concern:*

Be it known that I, WILLIAM HORLICK, Jr., a citizen of the United States, residing at Racine, in the county of Racine and State of Wisconsin, have invented certain new and useful Improvements in Food Compounds and Processes of Making the Same, of which the following is a specification.

This invention relates to improvements in food compounds or milk food powders and a process of making the same.

One of the objects of the present invention is to provide an improved food compound which will be highly nutritious and of a desirable flavor. A further object is to provide a simple and practical process of making a food compound of the above character which will be economical and inexpensive to carry out. Other objects will be in part obvious and in part hereinafter pointed out in connection with the following analysis of the invention.

In the manufacture of my improved compound I first reduce potatoes to starch by any desired method, preferably using the ordinary well-known method, which consists in taking whole sound esculent potatoes, removing the eyes and any foreign matter which may adhere to the potatoes, and then placing them in a revolving washing machine where they are subjected to a stream of flowing clean water. After the potatoes have been thoroughly washed in this manner they are passed to a mascerating machine which will reduce them to a pulp in the presence of a large amount of water.

The pulp resulting from this treatment is practically pure starch and is separated from the water for use in the subsequent steps of my process.

After separating the pulp from the water it is transferred to a vacuum cooker and cooked at a sufficient temperature and for a sufficient length of time to insure a thorough cooking and gelatinization of the starch. After this has been accomplished the temperature of the cooked starch is reduced to a temperature of approximately 140° F. to 145° F. or thereabout, which temperature is sufficiently low to permit the addition of barley malt which will bring about a conversion of the gelatinized starch into maltose and dextrin, due to the action of the diastase present in the malt. I have found in practice that about five pounds of barley malt to every 250 pounds of potato starch will produce this result satisfactorily. These proportions may, however, be varied as may be found desirable.

I then prepare a second mash which contains whole wheat, oats, rye, corn or other suitable flour and ground barley malt or malt flour, or I may use instead of the flour corn starch and mix with that the ground barley malt or malt flour. I mix the flour or corn starch, as the case may be, with the ground barley malt or malt flour, using from 30 to 35 pounds of the flour or corn starch to every three pounds of barley malt or malt flour, and adding approximately gallon of water for every three pounds of malt or malt flour used. The proportion of malt to the flour or corn starch should in any case be sufficient to permit the diastase of the malt to cause a sufficiently complete inversion of the starch into maltose, and a modification, due to the action of the peptase of the malt, of the insoluble albuminoids into soluble form such as peptones and amids.

An initial temperature of approximately 140° F. should be employed in heating this second mash while it is kept in constant agitation. Thereafter the temperature of the mash should be raised to approximately 150° to 155° F. and this latter temperature retained for thirty minutes more or less.

The first mash formed from the potato starch is then mixed with the second described mash formed from the oat flour or corn starch, using approximately five parts of the potato starch mash to one part of the flour or corn starch mash. This mixture is then kept in constant agitation for about fifteen minutes to insure a complete mixing of the two mashes, the temperature during this time being maintained at about 155° F. and thereafter the mixture should be subjected to a finishing temperature of about 165 to 170° F. in order to insure a complete conversion of the starch into maltose and dextrin.

From this product the wort is extracted in any usual or ordinary way and with this extract or wort is mixed fresh milk in the proportion of two parts of milk to one part of the liquid wort. The mixture of the wort and milk is then dried in any ordinary or desired manner either by using a vacuum at a temperature of about 120 to 125° F. or using the spraying method or in any other way convenient.

The resulting product will be found to contain the desired proportions of proteids, fat and starch, so that it is highly nutritious as a food product besides possessing an agreeable flavor.

I claim:

1. A food product of the character set forth consisting of milk and the extracted liquid from a mash made from a mixture of potatoes, flour and barley malt.

2. A food product of the character set forth consisting of the dried liquid of combined milk and the extracted wort of a potato, flour and barley malt mash.

3. The process of making a food compound of the character set forth which consists in making potato starch, adding malt thereto, combining the same with a mash containing flour and barley malt, extracting the wort therefrom, and combining the same with milk.

4. The process of making a food compound of the character set forth which consists in combining the wort extracted from a potato, barley malt, and flour mash with milk, and drying the same whereby the liquid is reduced to powdered form.

5. The process of making a food compound of the character set forth which consists in cooking potato starch, adding malt thereto to form a mash, combining the mash with a mash containing flour and barley malt, extracting the wort therefrom, combining the wort with fresh milk, and reducing the liquid to powdered form by drying.

6. The process of making a food compound of the character set forth which consists in forming potato starch, adding barley malt thereto, combining the same with a mash formed of flour and barley malt in the presence of water, heating the same to a temperature of approximately 150° F., extracting the wort therefrom, combining the wort with milk, and drying the resultant liquid.

In testimony whereof I affix my signature in presence of two witnesses.

WM. HORLICK, Jr.

Witnesses:
A. J. Porter,
E. G. Nelson.